United States Patent Office 3,549,452
Patented Dec. 22, 1970

3,549,452
METHOD OF MAKING A LAMINATE HAVING
A BARRIER LAYER THEREIN
Jerome J. Walsh, Akron, Ohio, assignor to Morgan Adhesives Company, Stow, Ohio, a corporation of Ohio
No Drawing. Filed July 6, 1967, Ser. No. 654,313
Int. Cl. C09j 5/02
U.S. Cl. 156—315     8 Claims

ABSTRACT OF THE DISCLOSURE

A method of producing a laminated adhesive product with a barrier layer therein for preventing migration of plasticizer from a plastic layer, comprises applying a liquid polyisocyanate to the plastic layer, then applying an aqueous solution of polyvinyl alcohol resin, and thereafter drying the coating, and applying an adhesive layer to the dried surface.

---

The present invention relates to laminates, and especially to laminates including a plastic film made from a material having a plasticizer therein, and one or more layers of a barrier forming material are applied to the plastic film, and a final coating of an adhesive is applied to the barrier layers, which adhesive may have plasticizer therein and where the barrier layer or layers prevent migration of the plasticizer from one layer to the other.

At the present time, adhesive plastic tapes, bandages, decorative laminates, wall coverings, and the like, are well known and have achieved considerable commercial success. These materials frequently are prepared from an elastoplastic film backing and they normally include a tacky, pressure-sensitive adhesive layer or mass or other suitable adhesive material that can be heat or solvent activated by known methods. Usually, these elastoplastic backings are prepared from substances including a plasticizer which may have a tendency to migrate to the adhesive from the adjacent portions of the laminate, such plasticizers are used particularly where soft and flexible plastic films are desired particularly over a wide temperature range. However, coated products prepared with backing materials containing substantial amounts of such plasticizers therein tend towards excessive or undesirable lateral exudation of the adhesive mass in relation to the backing sheet. This condition may exist before the end use of such materials is realized, or after end use, and in both cases, such exudation is unsightly and unwanted for various reasons. Other problems that exist when the plasticizer migrates into the adhesive mass from the initial plastic film are: lowering the cohesiveness of the adhesive mass or layer, unwanted rising or lowering of the tack of such adhesive in the adhesive layer or mass, rising or lowering of the peel strength of the adhesive material, contamination of the substrate surface, change in chemical nature of the adhesive mass and solubilization of the component parts thereof, etc. Also, in some instances, the plastic backing film or layer may be affected by loss of plasticizer from itself as well as the reverse migration back into the plastic of plasticizer from the adhesive mass. This type of migration includes problems such as: shrinkage of the original film due to loss of mass, poor aging character of the film due to loss of soluble stabilizers, hardening due to loss of softening agent, and discoloration due to either loss of stabilization agents and/or to the contamination of foreign chemicals soluble in the plasticizer brought into the plastic by reverse migration.

Prior art efforts to prevent undesirable migration of plasticizer in laminates of the type to which the present invention relates have included using an adhesive in the laminate which required the presence of a plasticizer therein, and then balancing the amount of plasticizer in the adhesive so that the rate of migration from the adhesive was equal or nearly equal to the rate of plasticizer migrating to the adhesive from the plastic material or film. Other prior art efforts have related to the addition of chemicals to the initial plastic material used which, when present with certain types of plasticizers and/or plastic resins, will cause a chemical reaction linking such materials together to prevent the loss of plasticizer. Yet a third method of manufacture is the use of an impermeable or semi-permeable sheeting bonded to the plastic material and having the end use adhesive mass or layer affixed to the other side of such sheet. Such later composition is used mainly in solvent activated and pressure-sensitive applications. However, none of such previous laminates have been completely satisfactory, or they have been relatively expensive, or have been difficult to produce, or have been objectionable for other reasons.

The general object of the present invention is to provide a novel and improved method of forming a laminate having a barrier layer therein and to the provision of a novel laminate product including a film or layer made from an elastoplastic containing plasticizer.

Another object of the invention is to coat the film made from an elastoplastic material with a lipophobic material, such as a polyvinyl alcohol resin, and then to form a film or layer of an adhesive mass separately and apply it to the previously applied coat on the elastoplastic film.

Another object of the invention is to provide a novel and improved laminate made from an elastoplastic material and an adhesive layer or mass and wherein an intermediate barrier layer, or layers is provided between the elastoplastic and the adhesive to prevent migration of plasticizer material from either of the principal films or layers in the laminate.

Another object of the invention is to provide a barrier layer in an adhesive-plastic laminate and wherein the barrier is made from two liquid coating layers applied to the plastic layer and where the first coating action is done with a chemical such as a polyisocyanate, which is compatible with and chemically active with both the plastic film and a not yet applied second coat which is made from a lipophobic material essentially impermeable to lipids, and to be certain that the chemical reactions of the barrier materials proceed to completion.

The foregoing and other objects and advantages of the invention will be made more apparent as the specification proceeds.

In this specification, the term "elastoplastic" is generic term used in referring to elastic polymers and to thermoplastic resins. These materials may be modified with many types of materials that will alter their physical properties but usually will not vary the principal chemical characteristics or properties of such polymers or resins. One primary type of substance used to modify the elastoplastic material is that of the group called plasticizers. These are used to increase the flexibility, workability, or distensibili'y of the elastoplastic material and the amount and type of plasticizer used will depend on the specific material being compounded and the physical properties desired.

The molecular size of a plasticizer may vary from small to very large and the molecular weight usually is in the range of between 350 to 8,000. The higher the molecular weight, the more permanent is the plasticizer. Also, as the molecular weight of the plasticizer is increased, the volatility of the material is decreased. The plasticizers with high volatility are more subject to migrating from the elastoplastic than those of lower volatility.

In plasticizers, the molecular shape is as important as the molecular size. The shape of the molecule plays an important part in solvating the elastoplastic and solvation occurs when the weak attraction forces of one elastoplastic molecule for another are broken. The shape of the plasticizer molecule is a determining factor as to how fast the plastic molecules are separated and how well they are spread out one from the other.

The functional groups of the plasticizer are also important. Plasticizer molecules normally contain at least two functional groups and these functional groups can replace the attraction forces between elastoplastic molecules. The attraction between the plasticizer and the plasticized material can be a determining factor in plasticizer loss. The more important functional groups in plasticizers are: ester linkages, ether linkages, oxirane rings, amides, chlorine linkages and phosphate linkages. The position and number of these functional groups will affect the behavior of the molecules.

In the practice of this invention, the base elastoplastic layer is first coated with a material which is chemically compatible with the chemically active portions of both the plastic film and a second coat to be applied thereto and containing a lipophobic material essentially impermeable to lipids. In the practice of this invention, the first coat applied to the plastic comprises a polyisocyanate, or a solution thereof, which may be written as $R(N=C=O)n$ where $n$ is 2 or more. The invention particularly contemplates use of polyisocyanates where the reaction groups preferably are on a primary and a secondary site, and suitable or typical examples of isocyanates that may be used are as follows: 2,4 or 2,6 toluene diisocyanate, triphenyl methane triisocyanate, dianisidene diisocyanate, diphenyl methane diisocyanate, polymethylene polyphenyl isocyanate, or an aduct of toluene diisocyanate and 1,4 acetonediol. Some of these materials are of the structures of:

(1) Tolylene diisocyanate

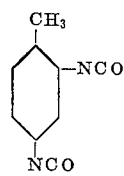

(2) Polymethylene polyphenol isocyanate

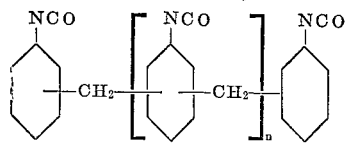

(3) Diphenylmethane diisocyanate

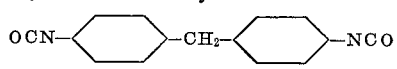

(4) Triphenylmethane triisocyanate

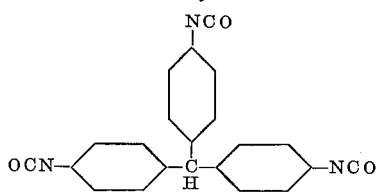

The aforementioned polyisocyanates are examples and are not meant to limit the scope of this invention to their use only as there are other equivalent and/or similar polyisocyanates with more than two isocyanate radicals therein that will perform the same function. The use of three or more cyanate groups provides a more positive bond of the cyanate layer to adjacent materials.

After coating the surface of the plastic material with a polyisocyanate a second coating is applied which will act as the lipophobic membrane or plasticizer barrier and which will react chemically with the polyisocyanate used. This second coating is a solution of polyvinyl alcohol resin. Polyvinyl alcohol resins are the reaction product of polyvinyl esters, mainly polyvinyl acetate, and an alcohol in the presence of a catalyst. The polyvinyl alcohol resin component may be of various molecular weight and of various degree of hydrolysis. The second coating may also contain other ingredients to act primarily as insolubilizers or curing agents for the polyvinyl alcohol.

To illustrate the representative embodiments of the invention by way of example only but not to limit its scope in any way, illustrative examples are furnished below, and it should be noted that all figures given refer to parts by weight unless otherwise specified.

EXAMPLE 1

| | Parts |
|---|---|
| 1st coat: | |
| PAPI | 100 |
| 2nd coat: | |
| Water | 88 |
| 98% hydrolized PVA | 12 |

PAPI is polymethylene polyphenylisocyanate provided by the Carwin Chemical Co., a division of the Upjohn Company. In the above example, the second coating material is prepared by dissolving the polyvinyl alcohol resin used in hot water and allowing the solution to come to room temperature after the resin is in solution. The resin used was Gelvatol 1–90, 99% hydrolized, which is provided by the Resin Division of Monsanto Chemical Company. In the coating action, the first coating is applied to the vinyl resin film and the second coating is usually immediately applied thereover. Then next the film is dried at about 120° F. for several minutes and a coating of pressure-sensitive adhesive is applied to the dried film. As a feature of the invention, the coated product is next stored at between about 70° to 80° F. for several days, for example between two and five days and preferably five days before it is used. Usually in applying the coating of pressure-sensitive adhesive or equivalent material to the plastic laminate, such layer of pressure-sensitive adhesive is first built up or formed upon a release material or paper sheet with a proper coating thereon. Then, the pressure-sensitive adhesive layer is brought into engagement with the coating on the plastic base material and transferred thereto by a suitable pair of rolls between which the laminate would pass, or by other conventional means.

It has been determined that the reaction of the polyvinyl alcohol resin film with the adjacent polyisocyanate and the reaction between the isocyanate and the elastoplastic material is an essential portion of the present invention and that the bond between the elastoplastic film and the polyvinyl alcohol is greatly enhanced after full or complete reaction has taken place between the two films and the polyisocyanate.

EXAMPLE II

| | Parts by wt. |
|---|---|
| 1st coat: | |
| PAPI | 20 |
| Tetrahydrafurane | 80 |
| 2nd coat: | |
| Water | 85 |
| Gelvatol 20–30 (PVA) | 15 |
| MO–70 | 0.05 |
| Ammonium dichromate | 2.00 |
| Gycerol | 0.1 |

The first coating is prepared by diluting the isocyanate with the solvent while under agitation.

The second coating is prepared by dissolving the PVA resin in hot water such as water at about 140 to 170°, then cooling to room temperature and adding the rest of the ingredients.

The first coating is applied to a plasticized vinyl film and allowed to dry for about one minute at 120° F. The second coating is then applied and dried at 130° F. for about five minutes and the vinyl film is next laminated to the pressure-sensitive adhesive which has been cast on a release carrier. The material was then allowed to stand at room temperature for at least two to five days before using.

Gelvatol 20-30 is an 88% hydrolized polyvinyl alcohol resin manufactured by Monsanto Chemical Company Monawet MO-70 is a sodium sulfosuccinate wetting agent manufactured by Mona Industries. Ammonium dichromate is an isolubilizer for polyvinyl alcohol resins. Gycerol is a U.S.P. grade glycerin manufactured by McKesson & Robbins Co.

EXAMPLE III

| 1st coat: | Parts by wt. |
|---|---|
| Dianisidene diisocyanate | 15 |
| Tetrahydrafurane | 15 |
| Methyl ethyl ketone | 70 |
| 2nd coat: | |
| Water | 100 |
| Elvanol 72-60 | 15 |
| Cymel 3900 | 1.5 |
| Triton X-100 | 0.02 |
| Ammonium chloride | 0.005 |

The isocyanate is dissolved in the two solvents and, when completely dissolved, then is ready for use as a coating liquid.

The second coating is made by adding the Elvanol to hot water and mixing until a homogeneous mixture is obtained. The Cymel resin and Triton X-100 and the salt are now added and the mixture allowed to cool to room temperature.

The same coating procedure is followed as in the first two examples cited.

When vinyl webs are coated in such a manner and adhesive is applied the physical properties of both are enhanced. Spectrographic analysis has shown very minute to no migration of plasticizer into the adhesive mass. The unwanted changes that take place as migration occurs have been arrested and the life of the product has been increased greatly.

Triton X-100 is supplied by the Rohn & Haas Co. and is a wetting agent based on alkylaryl polyether alcohol.

Elvanol 72-60 is a 99% hydrolized polyvinyl alcohol resin supplied by the E. I. du Pont de Nemours Company. Cymel 3900 is a melamine-formaldehyde resin provided by the American Cyanamid Company and is a suitable material that functions as an insolubilizer for the resin or plastics used in the laminate.

The liquid coatings applied to the base elastoplastic layer can be applied thereto in any conventional manner as by moving the elastoplastic layer or film over a moving roll which dips into the liquid coating material and carries a film thereof up for application to the elastoplastic layer. This elastoplastic layer can be any desired thickness of any conventional nature. It can be made from any desired elastic polymer such as, Neoprene® (E. I. du Pont Co.), for example, and any desired thermoplastic resins, including any suitable vinyl resins, polyvinyl chloride resins, polyvinyl acetate, cellulose acetate, etc.

Any desired type of a conventional adhesive layer can be used in making the laminate of the invention, and usually a pressure-sensitive adhesive layer is applied. Such pressure-sensitive adhesive would, for example, be made from a conventional synthetic rubber, such as SBR, and other conventional compounding ingredients for adhesives, including plasticizers and tackifiers, may be present. Typical plasticizers used in the adhesive and/or in the elastoplastic, for example, would comprise phthalic acid esters, phosphoric acid esters, epoxidized esters, mineral oils, naphthenic processing oils, etc.

If desired, a non-tacky but conventional adhesive layer can be used wherein the adhesive layer or mass is activated by the use of heat, light or suitable solvents, as required. The plasticizers mentioned hereinbefore for use in the adhesives may also be present in the elastoplastic material, and/or other conventional plasticizers may be used therein.

In practice of the invention, it appears that the thickness or strength of the two solution coatings applied to the elastoplastic films may be varied widely and that excellent results can still be obtained.

RANGE OF COMPOSITIONS

First coating layer:
  Polyisocyanate—From about 3 to 100 parts by weight (Preferred about 20 parts by weight).
  Solvents—From about 0 to 97 parts by weight (Preferred about 80).
Second coating layer:
  Polyvinyl alcohol resin—From about 12 to 25 parts by weight resin (Preferred about 15 parts by weight resin).
  Water—From about 75 to 88 parts (Preferred about 85 parts).

In the practice of the present invention, when solutions of the polyisocyanate are to be used, it is quite important that the solvents used also be true solvents for the elastoplastic with which the isocyanate is to be associated. Thus tetrahydrafurane and methyl ethyl ketone are suitable solvents and are those preferred in practice of the present invention in most cases.

It should be also noted that the grade of the polyvinyl alcohol resin used is important in practice of the invention as different grades of this alcohol resin have different reaction rates and have a different number of reaction sites. Thus with a highly hydrolized polyvinyl alcohol, a different cure system is used than for a less highly hydrolized polyvinyl. In the use of material such as PAPI a curing or cross-linking action is obtained wherein the polyisocyanate cross-links with the polyvinyl alcohol resin and with the elastomeric material in the base film or layer. Whereas with the use of insolubilizing chemicals, the chemical may effect a cross-linking of polyvinyl alcohol to polyvinyl alcohol for improved water resistance.

The insolubilizing chemical chosen will depend upon the degree of hydrolysis of the polyvinyl alcohol. For example, a highly hydrolized polyvinyl alcohol such as Gelvatol 1-90, 99% hydrolized, will exhibit a high degree of cross-linking when a melamine-formaldehyde resin is used whereas an 88% hydrolized polyvinyl alcohol, such as Gelvatol 20-30, will show a higher degree of cross-linking when a dichromate salt is used.

In making the laminate of the invention, adhesives used may or may not have plasticizer present therein, as desired. Such plasticizer may or may not be the same plasticizer as that used in the initial elastomeric layer.

Dependent upon the type of material used in the base elastomeric film or layer, the temperature at which the laminating barrier film chemical reaction is achieved can be varied. Hence with the use of most vinyl films, it may be desired that the chemical reaction occur under room temperature conditions as such films may include, for example, from about 60% to about 150% plasticizer in relation to the vinyl resin present. Such films naturally vary widely in the temperature conditions they can withstand. With other elastomeric films which have more heat resistance, the reaction of the polyvinyl alcohol resin and isocyanate layers can be speeded by raising the temperature of the laminate during drying or after the initial liquid layers applied thereto have been dried so that a reduced amount of, or no "stand" time is required to complete such chemical reactions if the laminate is subjected to elevated temperatures. It is important, however, that this chemical reaction be permitted to go to its completion before the laminate is used, and two to five days stand time are required for example on the vinyl resins.

Laminates made in accordance with the invention have proven to have very effective barriers therein to prevent any migration of plasticizer from the elastomeric material over to the adhesive, or vice versa, whereby an improved, long lived laminate is provided. The new laminate fully protects the pressure-sensitive adhesive when used from any degradation caused by plasticized migration and, in addition, it increases the aging life of the elastoplastic film by preventing plasticizer migration therefrom. Yet another important feature of the present invention is that there is a substantial reduction of shrinkage of the elastoplastic film in the laminate. For example, when a .004 inch thick highly plasticized polyvinyl chloride film coated with a pressure sensitive adhesive was treated with a barrier primer as in Example II and aged for one week at 158° F. there was noted a reduction in shrinkage of 88% when compared to the same construction without the barrier and primer layers therein. This test was run according to ASTM, D–1042–51 test procedure. In addition, it appears that the adhesive maintains very good physical properties and strengths over a very long service life.

In practicing the invention, it should be understood that any suitable type of a plastic base film can be used and that any conventional adhesive means can be used. Thus, in Example 3 hereof, the vinyl film base used in such test comprised 100 parts polyvinyl chloride resin, 50 parts plasticizer—Paraplex G–25, which is a polyester type plasticizer made by the Rohm & Haas Company, and 15 parts of the plasticizer diocthyl phthalate, together with small amounts of whitener, in this instance 20 parts of titanium dioxide, and one part of a stabilizer, such as Ferro 1212–A, made by the Ferro Chemical Company of Cleveland, Ohio. In this particular instance, the pressure sensitive adhesive was formed from 100 parts of synthetic rubber GRS 1011, and 65 parts of the phthalic acid ester plasticizer resin referred to hereinbefore.

The novel laminate of the invention was processed and dried for approximately up to five days at ambient temperatures and then was tested. It was found that the laminate had improved shear and creep resistance properties in relation to previous types of laminates and that no shrinkage of the laminate occurred in comparing it to the same laminate construction made without the barrier and primer layers therein.

Hence, in view of the above, it is believed that the objects of the invention have been achieved.

What is claimed is:

1. A method of producing a laminated adhesive product with a barrier layer therein comprising the steps of
    providing a layer of polyvinyl chloride resin,
    applying a liquid polyisocyanate to the resin layer,
    applying an aqueous solution of polyvinyl alcohol resin to the previously coated resin layer,
    drying the liquid polyisocyanate and aqueous solution to form a primer coating, and
    applying an adhesive layer to the primer coated surface of the resin layer.

2. A method of producing a laminated adhesive product with a barrier layer therein for preventing migration of plasticizer comprising the steps of
    providing a plastic layer including an elastoplastic and a plasticizer,
    applying a coating of a material from the group of materials consisting of a liquid polyisocyanate and a polyisocyanate solution to the plastic layer,
    applying a coating of an aqueous solution of polyvinyl alcohol resin to the liquid coating on the plastic layer,
    drying the coatings on the plastic layer, and
    applying an adhesive layer including a plasticizer to the dried coated surface of the plastic layer.

3. A method as in claim 2 where the elastoplastic layer is made from a vinyl resin.

4. A method of producing a laminated adhesive as in claim 2 where the elastoplastic has a material therein with an active site and where a reaction will take place between the isocyanate and an active hydrogen ion at such site, and a reaction occurs between the polyisocyanate and the polyvinyl alcohol resin to bond the polyvinyl alcohol coating to the plastic layer.

5. A method of producing a laminated adhesive product as in claim 4 comprising the steps of drying the coatings at an elevated temperature for several minutes, and permitting said chemical reactions to react for several days before use of the laminate.

6. A method as in claim 2 where the polyvinyl alcohol resin solution comprises from about 12 to 25 parts of polyvinyl resin and the remainder is water.

7. A method as in claim 2 where the polyisocyanate is present as a solution with about 20 parts of polyisocyanate therein.

8. A method as in claim 2 where the coating of polyvinyl alcohol resin is applied immediately after the polyisocyanate coating is applied.

References Cited

UNITED STATES PATENTS

| | | | |
|---|---|---|---|
| 2,413,570 | 12/1946 | Krister et al. | 156—314X |
| 2,439,369 | 4/1948 | Nicol | 156—314X |
| 2,572,877 | 10/1951 | Morris et al. | 156—314X |
| 2,905,582 | 9/1959 | Coleman, Jr. et al. | 156—314X |
| 3,032,460 | 5/1962 | Chipman et al. | 156—310X |
| 3,075,863 | 1/1963 | Frey | 156—310X |
| 3,223,579 | 12/1965 | Dorland et al. | 156—315X |
| 3,240,650 | 3/1966 | Atwell | 156—315X |

REUBEN EPSTEIN, Primary Examiner

U.S. Cl. X.R.

156—314, 331; 117—122; 161—190